2 Sheets—Sheet 1.

R. ROSE.

Assignor to W. W. HALL, F. E. WATKINS & T. G. BETTS.

FURNACE GRATE.

No. 11,291. Reissued Nov. 29, 1892.

Witnesses
W. Harvey Murray.
T. R. Sheppard

Inventor
Robert Rose
By Alexander & Dennis
Attorneys

THE NORRIS PETERS CO., PHOTO-LITHO., WASHINGTON, D. C.

R. ROSE.

Assignor to W. W. HALL, F. E. WATKINS & T. G. BETTS.

FURNACE GRATE.

No. 11,291. Reissued Nov. 29, 1892.

Witnesses
W. Harvey Murray.
T. R. Sheppard

Inventor
Robert Rose
By Alexander & Dennis
Attorneys.

THE NORRIS PETERS CO., PHOTO-LITHO., WASHINGTON, D. C.

UNITED STATES PATENT OFFICE.

ROBERT ROSE, OF CALLIOPE, ASSIGNOR TO W. W. HALL, F. E. WATKINS, AND T. G. BETTS, OF HAWARDEN, IOWA.

FURNACE-GRATE.

SPECIFICATION forming part of Reissued Letters Patent No. 11,291, dated November 29, 1892.

Original No. 410,929, dated September 10, 1889. Application for reissue filed July 18, 1892. Serial No. 440,430.

*To all whom it may concern:*

Be it known that I, ROBERT ROSE, a citizen of the United States, residing at Calliope, in the county of Sioux and State of Iowa, have invented certain new and useful Improvements in Furnace-Grates; and I do hereby declare the following to be a full, clear, and exact description of the invention, which will enable others skilled in the art to which it appertains to make and use the same.

Figure 1:
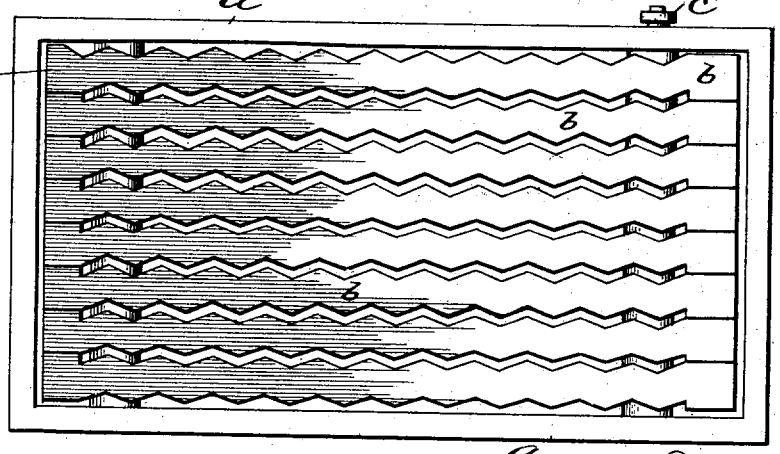
Figure 2:
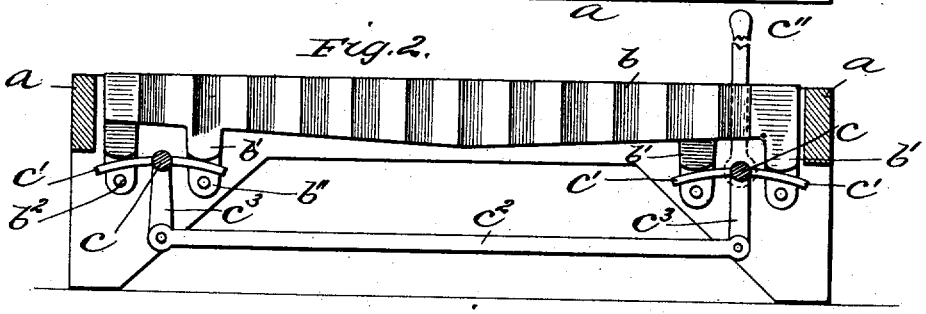
Figure 3:
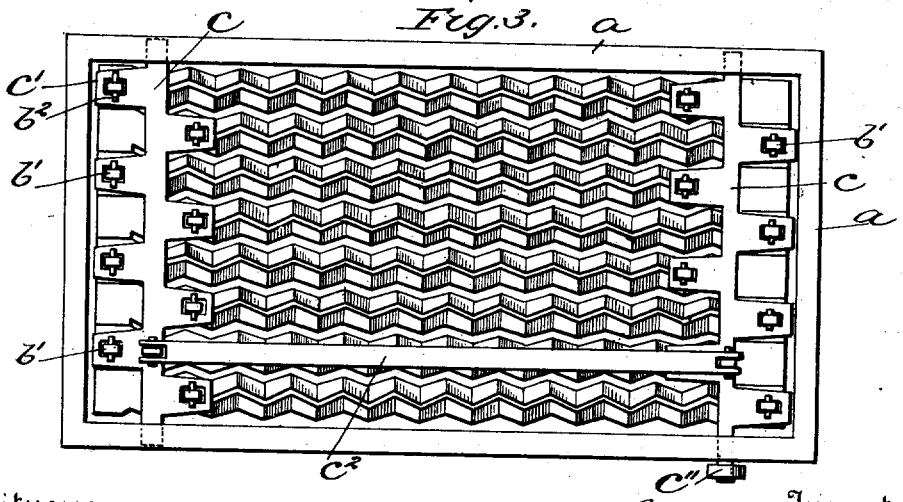
Figure 4:
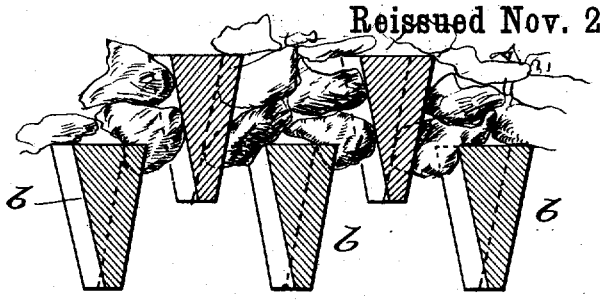
Figure 5:
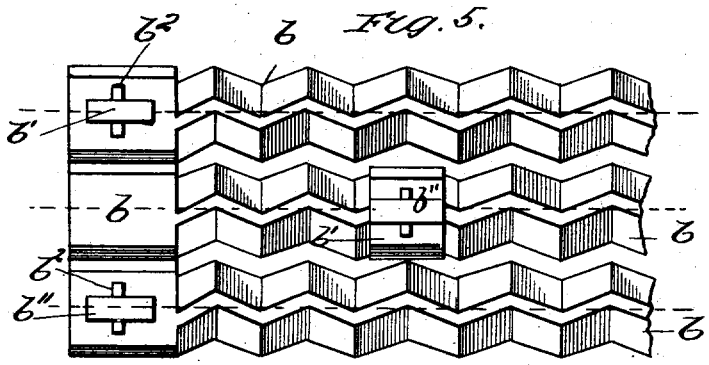
Figure 6:
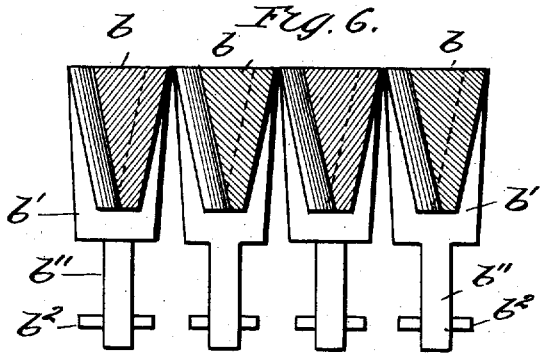

In the drawings, Figure 1 is a plan view of my improved grate; Fig. 2, a vertical longitudinal sectional view showing one form of mechanism for vertically vibrating the grate-bars; Fig. 3, a bottom view of the same; Fig. 4, a detail transverse section of a series of bars enlarged, showing the manner in which they are vertically vibrated in opposite directions to shake the ashes through and grind or break the clinkers; Fig. 5, a detail bottom view of portions of a series of bars enlarged; Fig. 6, a detail transverse section of several of the bars enlarged.

This invention relates to that class of furnace-grates wherein means are provided whereby the alternate grate-bars may have simultaneously imparted to them a limited compound movement—that is, reciprocated longitudinally and vibrated vertically—in opposite directions, the purpose of this movement being to grind the clinkers on the grate and shake the ashes through into the ash-pan, and thereby keep the draft-passages open and clear.

It is the object of this invention to overcome the drawbacks to the adoption of this class of grates and produce a grate that will possess the advantages of efficiency, durability, and practicability in an eminent degree, and which may be manufactured at about the same cost as the ordinary grates now in use, all of which fully appear in the course of this specification.

Referring to the drawings, *a* designates a rectangular frame which represents the grate-frame of an ordinary furnace and within which are supported the parallel grate-bars *b*. Journaled in the frame under the grate-bars are two transverse rock-shafts *c*, one being located near each end of the frame and each being provided with a series of horizontally-projecting arms $c'$, the alternate arms projecting in opposite directions and each being preferably curved slightly downwardly and provided with a slot. On the end of one of the shafts is secured an operating-lever $c''$, and pivotally connecting the two rigid depending arms $c^3$, carried by the shafts, is a horizontal rod $c^2$, which causes the shafts to rock in unison when operated by said lever. The grate-bars are provided at or near each of their ends with an integral depending supporting-arm $b'$, whose rounded lower ends rest upon the convexed surfaces of the arms of the respective shafts, each of these supporting-arms being provided with an extension $b''$, which pass loosely through the slots of the curved arms and work therein during the operation of the shafts. Transverse pins $b^2$ may be secured in these extensions $b''$ under the arms to prevent the grate-bars being disengaged from the arms. As will be observed, when the shafts are rocked in their bearings their arms serve to vibrate the grate-bars vertically a limited distance, the adjacent bars moving in opposite directions. A small space is left between the ends of the bars and the frame, as shown, so that during their vibratory motion they may reciprocate endwise a short distance, thus having a sort of compound movement in opposite directions. The advantage derived from resting the convexed ends of the depending arms of the bars on the convexed downwardly-turned shaft-arms is that the bars may be vibrated with a minimum of friction and for the further reason that the contacting surfaces will not be liable to become clogged by falling ashes and cinders, the bars being vibrated easily and smoothly and without undue noise. It will be observed that by this construction the bars are moved bodily up and down, so that their upper surfaces always preserve the same position relatively to a horizontal line.

The mechanism above described for imparting the vibration to the bars is the preferred construction for that purpose; but it should be understood that I do not confine myself to that construction, inasmuch as the same may be varied without departing from the invention.

The grate-bars are peculiarly formed. They are solid and their sides taper from their upper edges downwardly the full depth of the bars, their upper surfaces being broad and smooth and their lower edges being quite thin. They are also corrugated or serpentine in horizontal section, the corrugations being preferably angular and extending the full depth of the bars, thereby forming vertical V-shaped projections on both sides of the bars, which alternate with similarly-shaped depressions or grooves, the projections and depressions extending the full depth of the bars, and the projections on one side alternating with those on the opposite side, as shown. As thus constructed when the bars are placed side by side in the furnace the projections of each bar come opposite to the corresponding depressions in the adjacent bars, but do not project into the same, as shown, thus forming between each pair of bars a zigzag or serpentine draft-passage extending the full length of the grate, these passages (by reason of the corrugation and taper) widening uniformly to the bottom of the grate. The corrugated sides of the bars are kept the proper distance apart to keep the draft area uniform by means of the squared heads or projections $b^4$, formed on the ends of the bars, these squared ends abutting against each other, as shown, and preventing lateral motion of the bars when on a level with each other. These heads or projections $b^4$ are each preferably tapered slightly (considerably less than the corrugated part of the bar) toward the lower edge of the bar, as shown particularly in Fig. 6, so that during the vertical vibrations of the bars they will be free to have a limited sidewise vibration independently of each other, which will materially assist in shaking the ashes through the passages and perhaps also assist in clamping the clinkers between the grinding edges, as is evident. Thus tapering the heads also prevents ashes accumulating between them and creating friction.

In order that the bars may possess a sufficiently-broad supporting area and taper sufficiently to give the maximum draft area, the depressions at the upper edge of the bar terminate on each side of the central longitudinal line of the bar, and those at the bottom edge of the bar preferably extend to or across said line, as shown by the dotted central lines in Fig. 5. These proportions are found in practice to give the necessary supporting area and the maximum of draft space between the bars, as well as the greatest degree of durability.

The advantages of this invention are important. A great advantage arises from the durability of the bars—that is, their capacity to resist burning and warping—whereby they preserve their original shape and efficiency for a long time. This durability results from the peculiar construction of the bars and their arrangement with respect to each other, which, while it affords ample supporting area, at the same time gives the maximum free space between the bars, so that the ashes and cinders will not become clogged in falling and in order that the maximum amount of fresh air may circulate freely between the bars and serve to keep them cool. This peculiar construction also intensifies the fire and thereby prevents the usual great waste in fuel, the draft-passages tapering upwardly and uniformly and being smooth and free of obstructions the full length of the bars, and also being comparatively very wide at the bottom of the grate. It has been found in practice that at times, even when the fire is hottest, if the air has free access to the ash-pan, the lower thin edges of the grate-bars are kept sufficiently cool to bear the touch of the hand, and it is also found in practice that by this invention the fuel is almost entirely consumed, very little being wasted in the ashes.

Aside from the advantages derived from durability and an ample air-supply, perhaps the most important advantage is derived from the grinding and crushing action exerted by the bars on the clinkers that form in the fire and which usually have to be removed through the furnace-door or otherwise. In this grinding action the vertical vibration is the movement that is most essential. It will be observed that during the vertical vibration of the bars past each other the clinkers are caught between the downwardly-tapering corrugated sides and the recessed sharp upper edges of the lower bars and cut or crushed by a sort of cam action, as shown in Fig. 4, the clinkers broken being forced between the bars and deposited in the ash-pan below. This cam and cutting action is an essential feature of the invention, as it serves to effectually dislodge and pulverize the clinkers and obstructions on the grate, and also to shake the ashes through, whereby the draft-passages are always kept clear and open under the entire fire.

Another advantage derived from making the bars smooth on their upper surfaces and having the projections formed zigzag or serpentine is that the fire may be readily cleared off at any time by means of the usual ash-hoe or slice-bar, the surface of the grate being such that the tool will not hang or catch in the projections even after long usage.

I am aware that it is not new to impart to grate-bars a compound movement by means of rock-shafts provided with alternating bearing-arms, and therefore do not claim the same, broadly.

I am also aware that compound grates have had their bars provided with alternating teeth or projections, these teeth being for the alleged purpose of grinding the clinkers, but these grate-bars are impractical and have never come into general or continuous use.

Having thus fully described my invention, what I claim, and desire to secure by Letters Patent, is—

1. The combination of a series of grate-bars having their opposite sides of corrugated or serpentine form, the projected and cut-out portions both tapering from above downwardly the full depth of the bars, and means for vibrating the bars in opposite directions, whereby a cam or cutting action is exerted on the clinkers coming between them, substantially as described.

2. The combination of a series of solid grate-bars tapering from above downwardly and formed zigzag or serpentine in horizontal section their entire depth, the projections on one side of each bar alternating with those on the opposite side thereof, the bars being placed side by side, so that the projections of each bar will come opposite the cut-out portions of the adjacent bars and form zigzag or serpentine air-passages, widening from above downwardly, and means for vertically vibrating the bars in opposite directions, so that they will exert a cam or cutting action on the clinkers, substantially as described.

3. A series of furnace grate-bars having their opposite sides of serpentine or corrugated form, the projected and cut-out portions both tapering from above downwardly the full depth of the bar, in combination with a furnace, the rock-shafts having bearing-arms for said bars, the bar connecting the rock-shafts, and a lever for rocking one of the shafts, substantially as specified.

4. The combination of a series of bars tapering from above downwardly the full depth and formed corrugated or serpentine or horizontal section their full depth, said bars being each provided with a head at its ends, these heads abutting against each other and serving to keep the bars parallel and their projections opposite the cut-out portions of the adjacent bars, and means for supporting and imparting a bodily vertical vibration to the bar, substantially as described.

5. The combination of a series of parallel grate-bars tapered from above downwardly and formed corrugated in horizontal section, the bars being each provided with abutting heads at their ends, these heads tapering from above downwardly, as shown, and means for loosely supporting and vertically vibrating the bars in opposite directions, substantially as described.

In testimony whereof I hereunto set my hand, this 8th day of June, 1892, in the presence of two witnesses.

ROBERT ROSE.

Witnesses:
T. A. GREINER,
JOS. A. ASHLEY.